United States Patent
Malan

(10) Patent No.: US 10,893,053 B2
(45) Date of Patent: Jan. 12, 2021

(54) PREVENTING UNAUTHORIZED ACCOUNT ACCESS BASED ON LOCATION AND TIME

(71) Applicant: Roblox Corporation, San Mateo, CA (US)

(72) Inventor: Arthur Remy Malan, Menlo Park, CA (US)

(73) Assignee: Roblox Corporation, San Mateo, CA (US)

( * ) Notice: Subject to any disclaimer, the term of this patent is extended or adjusted under 35 U.S.C. 154(b) by 352 days.

(21) Appl. No.: 15/919,819

(22) Filed: Mar. 13, 2018

(65) Prior Publication Data

US 2019/0289016 A1 Sep. 19, 2019

(51) Int. Cl.
*H04L 29/06* (2006.01)

(52) U.S. Cl.
CPC ............ *H04L 63/107* (2013.01); *H04L 63/08* (2013.01); *H04L 63/108* (2013.01); *H04L 2463/082* (2013.01)

(58) Field of Classification Search
CPC ............ H04L 63/0812; H04L 63/0853; H04L 63/0876; H04L 63/107; H04L 63/108; H04L 63/0815
See application file for complete search history.

(56) References Cited

U.S. PATENT DOCUMENTS

| | | | | |
|---|---|---|---|---|
| 2004/0122974 | A1* | 6/2004 | Murakami | H04L 29/12216 709/245 |
| 2005/0071417 | A1* | 3/2005 | Taylor | G06Q 30/0261 709/200 |
| 2009/0305673 | A1* | 12/2009 | Mardikar | H04L 9/3249 455/411 |
| 2013/0317836 | A1* | 11/2013 | Wons | G06Q 50/22 705/2 |
| 2013/0339736 | A1* | 12/2013 | Nayshtut | H04L 63/08 713/170 |

(Continued)

OTHER PUBLICATIONS

Hyuntae Cho et al., Precise Location Tracking System based on Time Difference of Arrival over LR-WPAN, Sep. 2008, ACM, pp. 67-72. (Year: 2008).*

(Continued)

*Primary Examiner* — Luu T Pham
*Assistant Examiner* — Fahimeh Mohammadi
(74) *Attorney, Agent, or Firm* — IP Spring

(57) ABSTRACT

The subject matter of this specification can be implemented in, among other things, a method that includes storing, in a collaboration platform, a first geographic location and a first time of a first authentication request for an account at the collaboration platform responsive to successful authentication of the first authentication request. The method includes receiving a second authentication request for the account at the collaboration platform. The method includes identifying a second geographic location and a second time of the second authentication request. The method includes providing access to the account responsive to a determination that a difference in time between the first time and the second time is large enough that a user of the account is able to travel a difference in distance between the first geographic location and the second geographic location within the difference in time.

17 Claims, 4 Drawing Sheets

(56) References Cited

U.S. PATENT DOCUMENTS

| | | | |
|---|---|---|---|
| 2014/0006781 A1* | 1/2014 | Corella | H04L 9/3213 |
| | | | 713/168 |
| 2014/0121500 A1* | 5/2014 | Geier | G06T 7/74 |
| | | | 600/424 |
| 2014/0137199 A1* | 5/2014 | Hefetz | G06Q 20/32 |
| | | | 726/3 |
| 2014/0259129 A1* | 9/2014 | Copsey | G06F 21/40 |
| | | | 726/5 |
| 2015/0156267 A1* | 6/2015 | Zhang | H04L 67/18 |
| | | | 709/223 |
| 2015/0215297 A1* | 7/2015 | Rathod | G07F 17/0014 |
| | | | 726/7 |
| 2016/0210633 A1* | 7/2016 | Epelman | G06Q 20/4016 |
| 2018/0183884 A1* | 6/2018 | Zhang | H04L 67/02 |
| 2018/0197182 A1* | 7/2018 | Nidamanuri | G06Q 20/4016 |
| 2018/0219886 A1* | 8/2018 | Miron | H04L 63/1483 |
| 2018/0309754 A1* | 10/2018 | Magadevan | H04L 63/102 |

OTHER PUBLICATIONS

Eunjoon Cho et al., Friendship and Mobility: User Movement in Location-Based Social Networks, Aug. 2011, ACM, pp. 1082-1090. (Year: 2011).*

Carlo Schafer, Detection of Compromised Email Accounts used by a Spam Botnet with Country Counting and Theoretical Geographical Travelling Speed Extracted from Metadata, Nov. 3-6, 2014, IEEE, pp. 329-334. (Year: 2014).*

Andre van Cleeff et al., Benefits of Location-Based Access Control: A Literature Study, Dec. 18-20, 2010, IEEE, pp. 739-746. (Year: 2010).*

"Facebooks' Suspicious Login Tracking" https://www.securitygeneration.com/security/facebooks-suspicious-login-tracking/ retrieved Dec. 13, 2017.

WIPO, Written Opinion for International Patent Application No. PCT/US2019/020984, dated May 16, 2019, 6 pages.

WIPO, International Search Report for International Patent Application No. PCT/US2019/020984, dated May 16, 2019, 8 pages.

* cited by examiner

PREVENTING UNAUTHORIZED ACCOUNT ACCESS BASED ON LOCATION AND TIME

TECHNICAL FIELD

This instant specification relates to preventing unauthorized access of an account based on a location and time of the access.

BACKGROUND

Collaboration platforms allow users at client devices to connect to and share information with each other via the Internet. A collaboration platform may include, for example, a gaming platform, a social networking platform, a purchasing platform, a messaging platform, or a creation platform. Users of a collaboration platform, such as a gaming platform, may participate in online activities through the collaboration platform, such as multi-user gaming environments, designing custom gaming environments, decorating avatars, or exchanging virtual items with other users.

DETAILED DESCRIPTION

Figure 1:
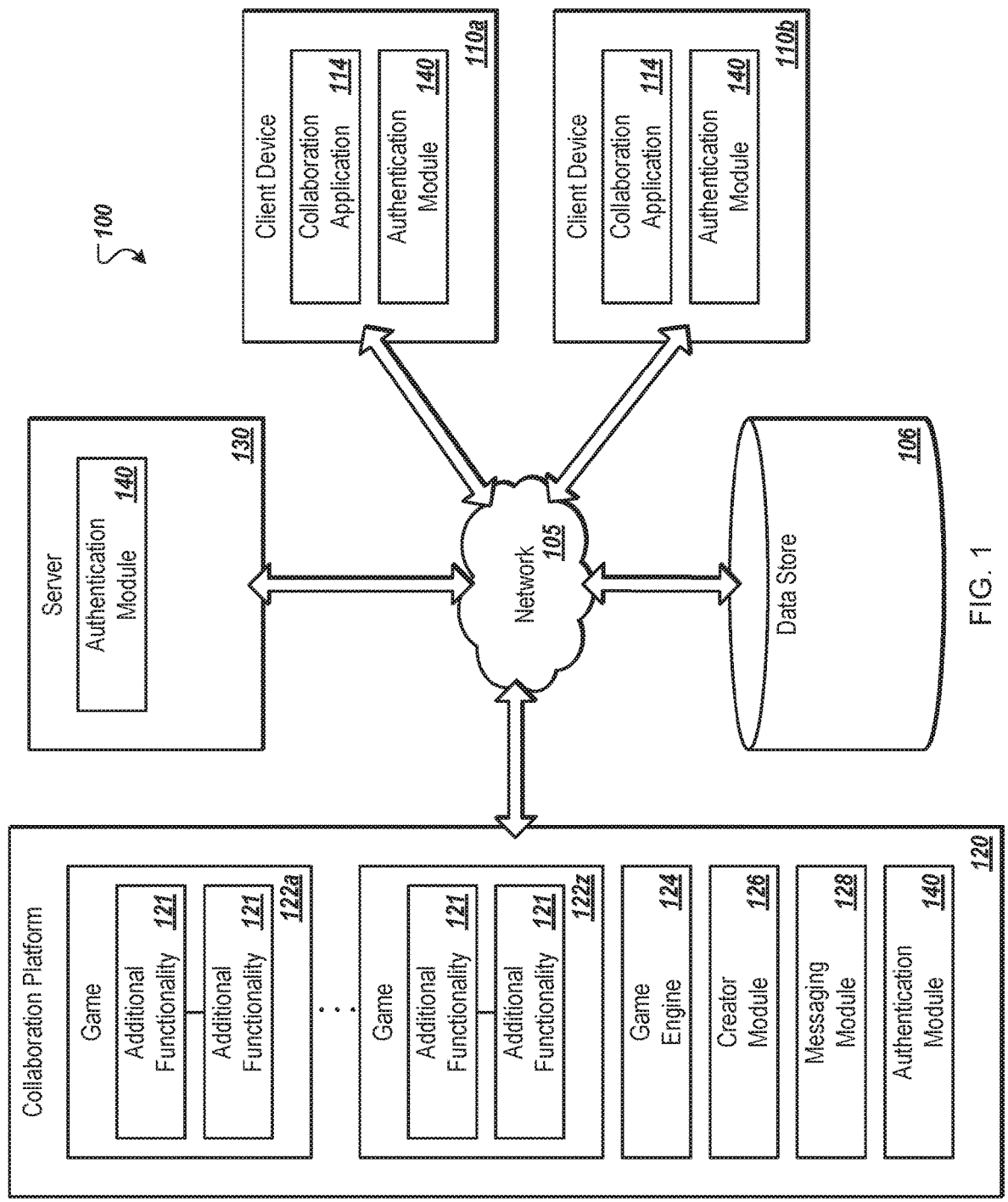
FIG. 1 is a block diagram that shows an example of a system for preventing unauthorized access of an account based on a location and time of the access.

This document describes systems and techniques for preventing unauthorized access of an account based on a location and time of the access. The system can store a previous location and a previous time of a previous access. The system can compare the subsequent location and the subsequent time of the subsequent access to the previous location and the previous time of the previous access. If the system determines that a difference in time between the previous time and the subsequent time is large enough that a user is able to travel from the previous location to the subsequent location within the difference in time, then the system may allow the subsequent access to occur. The details of one or more implementations are set forth in the accompanying drawings and the description below. Other features and advantages will be apparent from the description and drawings, and from the claims.

The systems and techniques described here may provide one or more of the following advantages. First, the system may provide an advantage over some authentication systems by preventing unauthorized access where an authentication request occurs at a time and geographic location that would not have allowed a user to travel from a previous time and geographic location where a previous authentication request occurred. This may indicate that the subsequent authentication request originated from a user other than the user that is associated with login information in the authentication requests. The other user may not be authorized to access an account of the user.

Second, the system may provide an advantage over some authentication systems by allowing for multiple thresholds for ranges of combinations of distance and time since the previous authentication. The thresholds may represent speeds at which a user may travel from the previous location. For example, the system may use a first threshold for the combined distance and time since the previous authentication that represents or approximates a walking speed of a pedestrian. The system may use a second threshold for the combined distance and time since the previous authentication that represents or approximates a speed of a relatively slow vehicle used for local travel, such as a car on low speed local roads or a bicycle. The system may use a third threshold for the combined distance and time since the previous authentication that represents or approximates a speed of a relatively fast vehicle used for distant travel, such as a car on a high speed road, a train, or an airplane. The system may reduce a number of false positives when preventing unauthorized access over some authentication systems by using multiple thresholds for the ranges of the combinations of distance and time since the previous authentication.

Third, the system may provide an advantage over some authentication systems by preventing unauthorized access even though an account of a user may not be associated with an email address, telephone number, or other external mode of authentication outside of login information for the account that is used to authenticate the user with the system. The system may prevent unauthorized access using a time and geographic location of a subsequent authentication request as compared to a previous time and geographic location of a previous authentication request without using the external modes of authentication to verify the authenticity of the user.

Accordingly, aspects of the disclosure provide prevention of unauthorized access of an account at a collaboration system. In particular, the aforementioned addresses technological challenges of preventing unauthorized access of an account where authentication information (e.g., a user name and password) for the account may be received from multiple geographic locations or where the account may not be associated with a factor for authentication other than the authentication information (e.g., a telephone number, an email address, or a one-time password generator). The aforementioned prevention of unauthorized access also improves the operation of a computer or computer network. For example, preventing unauthorized access of the account can reduce a load on a processor at the computing system being accessed through the account as well as a load on the network over which the access occurs.

It may be noted that a collaboration platform described as a gaming platform herein is provided for purposes of illustration, rather than limitation. A collaboration platform may be one or more of numerous platforms, such as a gaming platform, a communication platform, a social networking platform, a purchasing platform, a messaging platform, a creation platform, and so forth.

FIG. 1 is a block diagram that shows an example of a system 100 for preventing unauthorized access of an account based on a location of the access. The system 100 includes one or more client devices 110a-b, a data store 106, a collaboration platform 120, and a server 130 in communication over a network 105.

The network 105 may include a public network, such as one or more of the computing devices that make up the Internet, and/or a private network, such as a local area network (LAN) or wide area network (WAN). The network 105 may include a wired network, such as an Ethernet network, and/or a wireless network, such as a Wi-Fi network (e.g., an 802.11 network) and/or a cellular network (e.g., a Long Term Evolution (LTE) network). The network 105 may include one or more routers, hubs, switches, and/or server computers.

The data store 106 may be a memory (e.g., a random access memory), a cache, a drive (e.g., a hard drive and/or a flash drive), a database system, or another type of component or device capable of storing data. The data store 106 may also include multiple storage components (e.g., multiple drives or multiple databases) that may also span multiple computing devices (e.g., multiple server computers).

The server 130 may include one or more computing devices, such as a rackmount server or other a server computer. The server 130 may be included in the collaboration platform 120, or be part of another system or platform, or be an independent system.

The collaboration platform 120 may be one or more computing devices (e.g., a rackmount server, a router computer, a server computer, a personal computer, a mainframe computer, a laptop computer, a tablet computer, a desktop computer, etc.), data stores (e.g., drives, memories, databases), networks, software components, and/or hardware components that may be used to provide users at the client devices 110a-b with access to the collaboration platform 120. The collaboration platform 120 may also include a website (e.g., one or more webpages) or application back-end software that may be used to provide users at the client devices 110a-b with access to content provided by the collaboration platform 120.

The collaboration platform 120 may be a type of social network that provides connections between users. For example, a "user" may be represented as a single individual. Alternatively or in addition, a "user" may be an entity controlled by a set of users and/or an automated source. For example, a set of individual users federated as a community in a social network may be considered a "user." In another example, an automated consumer may be an automated ingestion pipeline, such as one or more games 122a-z or components of one or more of the games 122a-z in the collaboration platform 120.

The collaboration platform 120 may be a gaming platform. For example, the gaming platform may provide the games 122a-z to a community of users that may access or interact with the games 122a-z using the client devices 110a-b. The games 122a-z may be single-player and/or multi-player. The games 122a-z (also referred to as "video game," "online game," or "virtual game" herein) may be two-dimensional (2D) games, three-dimensional (3D) games, virtual reality (VR) games, or augmented reality (AR) games. Each of the games 122a-z may include an electronic file that can be executed or loaded using software, firmware, or hardware configured to present the game content (e.g., digital media item) to an entity.

In some implementations, the collaboration platform 120 hosts the games 122a-z and allows users to interact with the games 122a-z using one or more collaboration applications 114 at the client devices 110a-b. Alternatively or in addition, the data store 106 may host the games 122a-z for the collaboration platform 120 and provide the games 122a-z to the client devices 110a-b. Users of the collaboration platform 120 may play, create, interact with, and build the games 122a-z, or create and build content of the games 122a-z. For example, users may create characters, decoration for the characters, one or more virtual environments for an interactive game, or build structures in a game. Users may buy, sell, or trade game items, such as in-platform currency (e.g., virtual currency), with other users of the collaboration platform 120.

The collaboration platform 120 may transmit game content to the collaboration applications 114. Game content (also referred to as "content") may refer to any data or software instructions (e.g., in-game items, user information, video, images, commands, etc.) associated with the collaboration platform 120 or the collaboration applications 114. It may be noted that, while the collaboration platform 120 is described as hosting the games 122a-z, this is provided for purposes of illustration, rather than limitation. In some implementations, the collaboration platform 120 may host other content, such as one or more media items. The media items can include, but are not limited to, digital video, digital movies, digital photos, digital music, audio content, melodies, website content, social media updates, electronic books (e.g., eBooks), electronic magazines, digital newspapers, digital audio books, electronic journals, web blogs, real simple syndication (RSS) feeds, electronic comic books, software applications, etc. For example, a media item may be an electronic file that can be executed or loaded using software, firmware, or hardware configured to present the digital media item to a person using an output device, such as a display device or an audio output device.

The collaboration platform 120 may consolidate the game content from the client devices 110a-b and transmit the consolidated game content (e.g., gaming video, rendering commands, user input, graphics library commands, etc.) to each of the client devices 110a-b to display interactions of the multiple users in a multi-player gaming environment. The collaboration platform 120 may transmit the game content from the client devices 110a-b to another client device for the other client device to consolidate and display the game content. The collaboration platform 120 may receive the game content. For example, the collaboration platform 120 may receive a user input from the first client device 110a made by a first user and a second user input from the second client device 110b made by a second user. The collaboration platform 120 may generate a game result based on the received first user input and the received second user input, such as the first user beating the second user in one of the games 122a-z. The collaboration platform 120 may then transmit the game results to the client devices 110a-b to inform the first user and the second user of the game results.

The collaboration platform 120 may associate each account of each user with one or more characters or avatars that may participate in one or more of the games 122a-z. The collaboration platform 120 may associate one or more of the games 122a-z with a particular user account or particular group of user accounts (e.g., a private game). The collaboration platform 120 may make one or more of the games 122a-z widely available to user accounts within the collaboration platform 120 (e.g., a public game). Where the collaboration platform 120 associates one or more of the games 122a-z with a specific user account or group of user accounts, the collaboration platform 120 may associate the specific user account or the group of user accounts with the one or more of the games 122a-z using user account information (e.g., a user account identifier such as username and password).

In some implementations, the games 122*a-z* may include base functionalities and one or more additional functionalities 121. The collaboration platform 120 may allow user accounts at the client devices 110*a-b* to participate in the base functionalities of the games 122*a-z* without using the additional functionalities 121 of the games 122*a-z*. In some implementations, the collaboration platform 120 grants the base functionalities to all (or most) of the user accounts of the collaboration platform 120. The collaboration platform 120 may grant the additional functionalities 121 for a smaller set of the user accounts, such as the user accounts of a trusted relationship. In some implementations, the additional functionalities 121 may allow sensitive interactions between user accounts, such as messaging functionalities, following functionalities, sharing functionalities, purchasing functionalities, or inviting functionalities.

The collaboration platform 120 may make the additional functionalities 121 available between user accounts that have established trusted relationships with each other. The collaboration platform 120 may prevent user accounts that have not established a trusted relationship with each other from using the additional functionalities 121 to interact with each other. In some implementations, the collaboration platform 120 may prevent user accounts of the collaboration platform 120 that are associated with a user that is under a threshold age, such as minors that under 13 years old, from using the additional functionalities 121 to interact with other users with whom a trusted relationship has not been established. In some implementations, the collaboration platform 120 may prevent user accounts of the collaboration platform 120 for which less than a threshold amount of information has been provide (e.g., guest user accounts and user accounts that have not provided a birth date) from using the additional functionalities 121 to interact with other users with whom a trusted relationship has not been established. In some implementations, the collaboration platform 120 may prevent user accounts of the collaboration platform 120 that have participated with the collaboration platform 120 for less than a threshold amount of time (e.g., have been registered with the collaboration platform 120 for less than a threshold amount of time, such as less than one month ago, or have logged less than a threshold amount of time of actively participating in the collaboration platform 120, such as less than fifty hours of game time) from using the additional functionalities 121 to interact with other users with whom a trusted relationship has not been established.

The additional functionalities 121 may include a messaging functionality that allows a first user account to communicate with at least one second user account using a messaging service, such as a messaging module 128, via the collaboration platform 120 (e.g., to send posts, chats, personal messages, public messages, or messaging in a virtual gaming environment). For example, the additional functionalities 121 of the games 122*a-z* within the collaboration platform 120 may allow user accounts to transmit messages to each other. In another example, the additional functionalities 121 allow user accounts to transmit types of information (e.g., sensitive information, contact information, name, picture, voice recording, current location, or unique identifiers, such as a device identifier) to each other that would otherwise be filtered by the messaging module 128.

The additional functionalities 121 may include a sharing functionality that allows a first user account to share one or more items with at least one second user account via the collaboration platform 120. For example, user accounts of the collaboration platform 120 for a gaming platform may have a sharing functionality that allows the user accounts to purchase, trade, or transfer virtual items, such as virtual currency, in a virtual gaming environment.

The additional functionalities 121 may include a following functionality that allows at least one first user account to follow a second user account into one of the games 122*a-z* or into a specific gaming environment of one of the games 122*a-z* hosted by the collaboration platform 120. For example, the second user account may be participating in the first game 122*a*, the following functionality may allow the first user account to navigate to a profile page of the second user account, select an option "Join Game" on the profile page, and the following functionality may place the first user account in the first game 122*a* (e.g., the specific gaming environment of the first game 122*a* where the second user account is participating). In some implementations, the following functionality may also include notification features that, for example, notify the first user account of the first game 122*a* in which the second user account has moved or is currently participating.

The additional functionalities 121 may include an invitation functionality that allows a first user account to invite at least one second user account to a private one of the games 122*a-z* hosted by the collaboration platform 120. For example, the first user account may create the private one of the games 122*a-z* and the invitation functionality may allow the first user account to invite the second user account to participate in the private one of the games 122*a-z*.

The additional functionalities 121 may include a group functionality that allows multiple user accounts to join a group hosted by the collaboration platform 120. For example, the additional functionality 121 may allow a first user to invite at least one second user account to a group where the first user account is a group member or group creator. In some implementations, the collaboration platform 120 may allow the members of a group to participate with each other to compete against members of a different group in one of the games 122*a-z*. The collaboration platform 120 may allow the members of a group to participate with each other in building within one of the games 122*a-z* or creating one of the games 122*a-z* (e.g., via a creator module 126). The collaboration platform 120 may allow the members of a group to engage in discussion with each other (e.g., in a group discussion via the messaging module 128).

The additional functionalities 121 may include an interaction functionality that allows a first user and at least one second user to interact with each other via the collaboration platform 120. For example, the base functionality may allow the first user to participate in single-player games and the interaction functionality may allow the user to participate in multi-player games with other users. In another example, the base functionality may allow the first user to compete against other users in the first game 122*a* and the interaction functionality may allow the first user to work together with the second user to compete against other users in the first game 122*a*. In some implementations, the collaboration platform 120 may include a game engine 124. The game engine 124 may be used for the development or execution of the games 122*a-z*. For example, the game engine 124 may include a rendering engine ("renderer") for 2D, 3D, VR, or AR graphics, a physics engine or collision detection (and collision response), sound, scripting, animation, artificial intelligence, networking, streaming, memory management, threading, localization support, scene graph, or video support for cinematics.

In some implementations, the collaboration platform 120 may include the creator module 126. The creator module 126 may allow users to become creators to design or create environments in an existing one of the games 122a-z, create new games, or create new items within the games 122a-z or environments. In some implementations, each of the games 122a-z may have a common set of rules or a common goal, and the environments of the games 122a-z may share the common set of rules or the common goal. Different ones of the games 122a-z may have different rules or goals from one another. The games 122a-z may have one or more environments where multiple environments may be linked. For example, a user may build a virtual environment that is linked to another virtual environment created by another user. A character within one of the games 122a-z may cross a virtual boarder between the virtual environment and the other virtual environment to enter the other virtual environment that is adjacent to the virtual environment. Items may refer to objects that are used, created, shared or otherwise depicted in the games 122a-z of the collaboration platform 120. For example, the items may include a character, tools, clothing, buildings, vehicles, currency, and so forth.

The client devices 110a-b may each include computing devices such as personal computers (PCs), mobile devices (e.g., laptops, mobile phones, smart phones, tablet computers, or netbook computers), network-connected televisions, gaming consoles, etc. In some implementations, the client devices 110a-b may also be referred to as "user devices." The client devices 110a-b may connect to the collaboration platform 120 via the collaboration applications 114 at any given moment.

Each of the client devices 110a-b may include an instance of the collaboration applications 114. The collaboration applications 114 may include applications that allow users to use and interact with the collaboration platform 120, such as control a virtual character in a virtual game among the games 122a-z hosted by the collaboration platform 120, or view or upload content, such as images, video items, web pages, documents, and so forth. The collaboration applications 114 may include web browsers that can access, retrieve, present, or navigate content (e.g., a virtual character in a virtual environment, etc.) served by a web server. The collaboration applications 114 may render, display, or present the content (e.g., a web page or a media viewer) to the users on display devices at the client devices 110a-b. The collaboration applications 114 may also include embedded media players (e.g., a Flash® player) that is embedded in a web page. The collaboration applications 114 may include standalone applications (e.g., a mobile application, app, or a gaming program) that allow users to interact with the collaboration platform 120. The collaboration applications 114 may include applications for users to create, edit, upload content to the collaboration platform 120 as well as interact with the collaboration platform 120. The server 130, or the collaboration platform 120, may provide the collaboration applications 114 to the client devices 110a-b. For example, the client devices 110a-b may download the collaboration applications 114 from the server 130, the collaboration platform 120, or the data store 106.

The collaboration platform 120 may include an authentication module 140. A user at one of the client devices 110a-b, such as the first client device 110a, may log in to an account of the user at the collaboration platform 120 via an application, such as one of the collaboration applications 114 or an instance of the authentication module 140 at the first client device 110a. The application at the first client device 110a may receive authentication information, such as a user name and a password, from a user at the first client device 110a. Alternatively or in addition, the application at the first client device 110a may retrieve stored authentication information that was previously entered by the user at the first client device 110a, such as encrypted authentication information that is stored at the first client device 110a. For example, an instance of the collaboration applications 114 at the first client device 110a may include a web browser application that may store the encrypted authentication information in a cookie at the first client device 110a. The application at the first client device 110a may provide the authentication information to the authentication module 140 at the collaboration platform 120 in a request for authentication.

In some implementations, the authentication module 140 at the collaboration platform 120 receives the authentication request from the first client device 110a. The authentication module 140 may identify client device information of the first client device 110a. The authentication module 140 may identify the client device information within the content or metadata of the authentication request. For example, the client device information may include a network address (e.g., an Internet Protocol address) of the first client device 110a or a fingerprint of the first client device 110a, such as a browser fingerprint provided by the browser application or other client device fingerprint information provided by the application or the first client device 110a, that sent the authentication request to the collaboration platform 120. The application or the first client device 110a may provide fingerprint information including one or more of a media access control (MAC) address of a network interface controller (NIC) that the first client device 110a uses to communicate with the network 105, an identifier provided by a central processing unit (CPU) or other processing unit of the first client device 110a, an identifier of a storage device at the first client device 110a, an operating system identifier or version, or an identifier or version of the application. The browser application may provide the fingerprint information in user agent metadata included in a header of the authentication request, such as one or more of an indication of compatibility with a version of a rendering standard, a client device type, an operating system type or version, a language used by the client device or the application, a rendering platform type or version used by the browser, a browser type or version, or an indication of available browser extensions.

In some implementations, the authentication module 140 at the collaboration platform 120 compares the identified client device information for the first client device 110a to stored client device information for a previously received authentication request that was successfully authenticated. For example, the authentication module 140 may have received the previous authentication request from the second client device 110b. The authentication module 140 may have identified the stored client device information from the previous authentication request received from the second client device 110b. In some implementations, the previous authentication request is the authentication request that was the last to be successfully authenticated prior to receiving the current authentication request from the first client device 110a.

In some implementations, in comparing the client device information, the authentication module 140 may compare the identified network address of the first client device 110a to the stored network address of the second client device 110b and the identified browser fingerprint provided by the browser at the first client device 110a to the stored browser fingerprint provided by the browser at the second client device 110b. If both are different, then the authentication module 140 may determine or estimate whether it is possible for the user to have traveled from a geographic location of the second client device 110*b* to a geographic location of the first client device 110*a* in the time between receipt of the previous authentication request and the current authentication request. Alternatively, if one is different, then the authentication module 140 may determine or estimate whether it is possible for the user to have traveled the distance in the time allotted. In another implementation, the authentication module 140 may compare either the network addresses or the browser fingerprints alone and if it is different, then the authentication module 140 may determine or estimate whether it is possible for the user to have traveled the distance in the time allotted.

In some implementations, to determine or estimate whether it is possible for the user to have traveled the distance in the time allotted, the authentication module 140 identifies or estimates the geographic locations of the client devices 110*a-b*. The authentication module 140 may have stored the previous geographic location of the second client device 110*b*, such as in the collaboration platform 120 or the data store 106. For example, the collaboration applications 114 (e.g., desktop applications, mobile apps, or web browser applications) at one or more of the client devices 110*a-b* may have access to geographic location information for the respective ones of the client devices 110*a-b*, such as from location services provided by operating systems at the client devices 110*a-b*. The location services provided by the operating systems may obtain the geographic location information of the respective ones of the client devices 110*a-b* from an interface to a global positioning system (GPS), a Wi-Fi positioning or triangulation system, or a cell tower positioning or triangulation system, for example. In some implementations, one or more of the client devices 110*a-b* have a fixed geographic location that may be reported directly by the respective ones of the client devices 110*a-b* or by another entity. For example, the authentication module 140 (e.g., in response to the respective ones of the collaboration applications 114 not being able to provide geographic locations) or the collaboration applications 114 may provide the network addresses of one or more of the client devices 110*a-b* to an external system, such as the server 130, that provides a lookup service to determine geographic locations from the network addresses.

In some implementations, to determine or estimate whether it is possible for the user to have traveled the distance in the time allotted, the authentication module 140 also identifies the times at which the authentication requests were received from the client devices 110*a-b*. The authentication module 140 may have stored the time that the previous authentication request was received from the second client device 110*b*, such as in the collaboration platform 120 or the data store 106.

In some implementations, the authentication module 140 determines or estimates whether it is possible for the user to have traveled the distance in the time allotted by comparing the combination of the difference in the times at which authentication requests were received and the distance between the geographic locations of the client devices 110*a-b* to one or more thresholds. The combination may represent an estimated or average speed for the user. The authentication module 140 may compare the calculated speed for the user to the thresholds to determine whether it was likely that the user could have traveled from the geographic location for the second client device 110*b* to the geographic location for the first client device 110*a* in the time between the authentication requests.

In some implementations, a first one of the thresholds may be based on an error or accuracy in the measurement or estimation of the geographic locations. For example, the error in a GPS location may be small and the accuracy may be high, such as ten to twenty feet, so the authentication module 140 may use a first threshold that is only about ten, twenty, or thirty feet (e.g., the maximum error or minimum accuracy in the reported geographic location information from a client device with GPS). However, the error in other positioning systems (e.g., Wi-Fi positioning, cell tower positioning, or reverse network address lookup) may be greater and the accuracy may be lower than those for GPS, so the authentication module 140 may have correspondingly higher thresholds for the other positioning systems. In some implementations, the client devices 110*a-b* may report the error or accuracy of the geographic location information or the source of the geographic location information to the authentication module 140 so that the authentication module 140 may adjust the first threshold accordingly.

In some implementations, the authentication module 140 may use one or more other thresholds that represent typical or maximum speeds at which the user might travel from the previous geographic location to the current geographic location. An interval or range of time and distance for the second threshold may represent a moderate speed, such as local travel at walking speed or a speed of a vehicle on low speed local roads (e.g., a value in the range of about three to thirty-five miles per hour). An interval or range of time and distance for the third threshold may represent a faster speed, such as regional travel in a vehicle on high speed roads (e.g., a value in the range of about thirty-five to seventy miles per hour). An interval or range of time and distance for the fourth threshold may represent a fastest speed, such as distant travel in an airplane (e.g., a value in the range of about seventy to five hundred miles per hour). The thresholds are described further with respect to FIG. 2 below.

If the authentication module 140 determines that that it is possible for the user to have traveled the distance in the time allotted, then the authentication module 140 verifies or authenticates the authentication information in the current authentication request (e.g., by comparing the received user name and password to a stored user name and password for the account, or by comparing the received encrypted information to corresponding information). In some implementations, if the authentication module 140 determines that that it is not possible for the user to have traveled the distance in the time allotted, then the authentication module 140 does not verify or authenticate the authentication information. In some implementations, if the verification or authentication is successful (e.g., there is a match), then the authentication module 140 provides the user at the first client device 110*a* with access to the account of the user at the collaboration platform 120, and the authentication module 140 stores the identified time, the identified geographic location, and the identified client device information for the current authentication request so that the stored data may be compared to the corresponding data from a next or subsequent authentication request received by the authentication module 140. In some implementations, if the verification or authentication is not successful (e.g., there is no match), then the authentication module 140 does not provide the user at the first client device 110*a* with access to the account at the collaboration platform 120 and does not store the identified time, the identified geographic location, or the identified client device information for the current authentication request.

In some implementations, the determination by the authentication module 140 that it is not possible for the user to have traveled the distance in the time allotted indicates that a user at the first client device 110*a* that sent the current authentication request is not the user that is associated with the account who sent the previous successful authentication request from the second client device 110*b*. This may indicate that the user at the first client device 110*a* is not authorized to access the account at the collaboration platform 120. Accordingly, the authentication module 140 denies or prevents the user at the first client device 110*a* from accessing the account at the collaboration platform 120. Preventing unauthorized access based on the locations and times of the requests for access is an advantage over other authentication systems.

In some implementations, the account at the collaboration platform 120 may not have another form or factor for verification or authentication, such as an email address, phone number, or a one-time password (OTP) generator. For example, the user for the account may be a minor that is not authorized to provide an email address or phone number. In some implementations, the user or a representative of the user may initiate communication with the collaboration platform 120 (e.g., by sending an email to a published email address of the collaboration platform 120 or by making a telephone call to a published phone number of the collaboration platform 120) to confirm the unauthorized access or disaffirm the unauthorized access. For example, during the communication, the user or the representative of the user may provide an identification of unique information from the account to an administrator of the collaboration platform 120 to verify ownership or association with the account.

In some implementations, the authentication module 140 may allow a user with an account at the collaboration platform 120 to establish the trusted relationship with one or more accounts of other users at the collaboration platform 120. A first user of the first client device 110*a* and a second user of the second client device 110*b* may be logged into the collaboration platform 120 by the authentication module 140 prior to establishing the trusted relationship.

In some implementations, the authentication module 140 may be implemented on the server 130. In other implementations, the authentication module 140 may in part or wholly be implemented on the client devices 110*a-b*. In other implementations, the authentication module 140 may in part or wholly be implemented on the collaboration platform 120. In other implementations, the authentication module 140 may operate on one or more of the client devices 110, the server 130, or the collaboration platform 120 and may work in conjunction to perform the operations described herein.

The collaboration platform 120 may include the messaging module 128. The messaging module 128 may be a system, application, or module that allows users to exchange electronic messages via a communication system, such as the network 105. The messaging module 128 may be associated with the collaboration applications 114 (e.g., a module of the collaboration applications 114 or be a separate application). A user at one of the client devices 110*a-b* may interface with the messaging module 128 and exchange electronic messages among accounts of other users of the collaboration platform 120. The messaging module 128 may be, for example, an instant messaging application, a text messaging application, an email application, a voice messaging application, a video messaging application, or a combination of multiple applications, among others.

The messaging module 128 may facilitate the exchange of electronic messages between users. For example, a user may be logged into a messaging application on the first client device 110*a* and another user may be logged into a messaging application on the second client device 110*b*. The two users may start a conversation, such as an instant messaging conversation (e.g., via the messaging module 128). The messaging module 128 may help facilitate the messaging conversation by sending and receiving the electronic messages between the two users of the collaboration platform 120.

In some implementations, the messaging module 128 may prohibit users that have not established a trusted relationship from messaging each other. The messaging module 128 may prohibit a user from a subset of users (e.g., minors, users with less than full privileges) from messaging other users with whom the user has not established a trusted relationship. The messaging module 128 may prevent transfer of sensitive information, such as contact information (e.g., phone numbers, email addresses, addresses, websites, etc.) or identifying information (e.g., photo, name, current location), between users of the collaboration platform 120 (e.g., between users that have not established a trusted relationship). For example, the messaging module 128 may block messages and posts that contain contact information or filter contact information from messages and posts.

Responsive to the collaboration platform 120 preventing contact information from being shared between users that have not established a trusted relationship and the collaboration platform 120 performing a disable operation during the establishing of a trusted relationship, a first user being able to communicate with the second user outside of the collaboration platform 120 (e.g., with an authentication code) implies that the first user and the second user are not just "virtual friends" on the collaboration platform 120, but have a real world connection as well. Having an alternative form of communication outside of the collaboration platform 120 implies that the first user and the second user know each other outside of the collaboration platform 120 and may be real-life friends. The collaboration platform 120 providing the additional functionalities 121 for interactions between users that have an alternative form of communication outside of the collaboration platform 120 (e.g., implied real-life friends) is less susceptible to abuse than providing the additional functionalities 121 to users that only know each other via the collaboration platform 120.

In some implementations, functions described in one implementation as being performed by the collaboration platform 120 can also be performed on the client devices 110*a-b* or the server 130. In addition, the functionality attributed to a particular component can be performed by different or multiple components operating together. The collaboration platform 120 can also be accessed as a service provided to other systems or devices through appropriate application programming interfaces, and thus is not limited to use in websites. Although implementations of the disclosure are discussed in terms of collaboration platforms, implementations may also be generally applied to any type of social network providing connections between users.

In situations in which the systems discussed here collect personal information about users, or may make use of personal information, the users may be provided with an opportunity to control whether the collaboration platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the collaboration platform 120.

Figure 2:
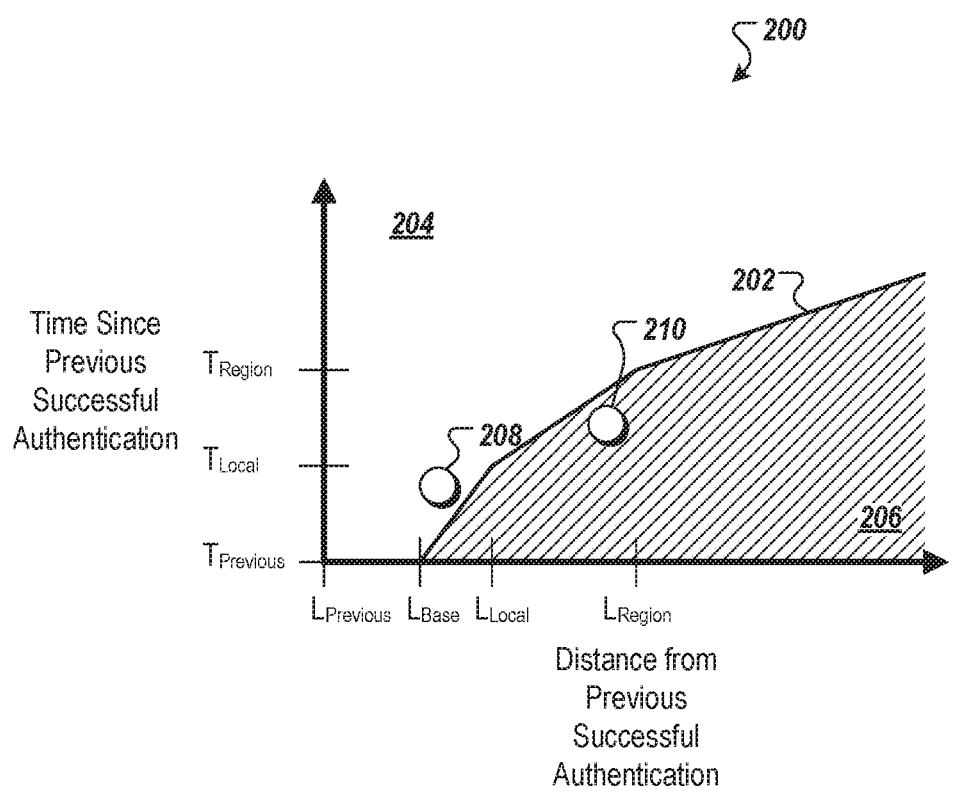
FIG. 2 is a graph that shows an example of a system for preventing unauthorized access of an account based on a location and time of the access.

FIG. 2 is a graph that shows an example of a system 200 for preventing unauthorized access of an account based on a location and time of the access. The vertical axis represents differences in time between receipt of a previous authentication request and a current authentication request, where $T_{Previous}$ is the time that the previous authentication request was received. The horizontal axis represents differences in distance between a geographic location of a previous authentication request and a geographic location of a current authentication request, where $L_{Previous}$ is the geographic location of a client device that sent the previous authentication request. The authentication module 140 may perform a piece-wise evaluation of the multiple thresholds. The thresholds may be represented by a line 202 that divides an authorized area 204 from an unauthorized area 206.

In some implementations, the first threshold includes the distance between $L_{Previous}$ and $L_{Base}$, which may represent the maximum error or minimum accuracy in the measurements of the geographic locations of the client devices 110a-b, as described above with respect to FIG. 1. The range of time for the first threshold may be zero. If the authentication module 140 receives an authentication request at the same time as the previous authentication request, then the authentication module 140 may determine or estimate that it is possible for the user to have traveled up to $L_{Base}$ from $L_{Previous}$. This may be represented on a geographical map as a circle of radius $L_{Base}$ centered around $L_{Previous}$.

In some implementations, the second threshold includes the distance between $L_{Base}$ and $L_{Local}$, which may represent the distance a user may travel at a low speed in a local area, as described above with respect to FIG. 1. The range of time for the second threshold is $T_{Previous}$ to $T_{Local}$. The slope of the line 202 within the time interval $T_{Previous}$ to $T_{Local}$ and the distance interval $L_{Base}$ and $L_{Local}$ may represent the maximum allowed speed of the user for the time interval. If the authentication module 140 determines that the current authentication request is within the time interval for the second threshold, then the authentication module 140 may determine or estimate that it is possible for the user to have traveled up to $L_{Base}$ plus the difference in the times of the authentication requests multiplied by the threshold speed (e.g., the slope of the line 202) in the time interval for the second threshold (See equation below). This may be represented on a geographical map as an annulus centered around $L_{Previous}$ between $L_{Base}$ and $L_{Local}$. For example, the current authentication request may be represented by a point 208 on the graph. The authentication module 140 may determine that the point 208 is within the time interval for the second threshold and lies above the line 202 in the authorized area 204.

$$\text{Distance}_{max} = L_{Base} + \Delta\text{Time} \times \text{Threshold}_2$$

In some implementations, the third threshold includes the distance between $L_{Local}$ and $L_{Region}$, which may represent the distance a user may travel at a higher speed in a regional area, as described above with respect to FIG. 1. The range of time for the third threshold is to $T_{Local}$ to $T_{Region}$. The slope of the line 202 within the time interval $T_{Local}$ to $T_{Region}$ and the distance interval $L_{Local}$ and $L_{Region}$ may represent the maximum allowed speed of the user for the time interval. If the authentication module 140 determines that the current authentication request is within the time interval for the third threshold, then the authentication module 140 may determine or estimate that it is possible for the user to have traveled up to $L_{Base}$, plus $T_{Local}$ multiplied by the threshold speed for the second threshold, plus the difference in the times of the authentication requests minus $T_{Local}$ and multiplied by the threshold speed (e.g., the slope of the line 202) in the time interval for the third threshold (See equation below). This may be represented on a geographical map as an annulus centered around $L_{Previous}$ between $L_{Local}$ and $L_{Region}$. For example, the current authentication request may be represented by a point 210 on the graph. The authentication module 140 may determine that the point 210 is within the time interval for the third threshold and lies below the line 202 in the unauthorized area 206.

$$\text{Distance}_{max} = L_{Base} + T_{Local} \times \text{Threshold}_2 + (\Delta\text{Time} - T_{Local}) \times \text{Threshold}_3$$

In some implementations, the fourth threshold includes the distance between $L_{Region}$ and above, which may represent the distance a user may travel at a highest speed in a distant area, as described above with respect to FIG. 1. The range of time for the fourth threshold is to $T_{Region}$ and above. The slope of the line 202 within the time interval $T_{Region}$ and above and the distance interval $L_{Region}$ and above may represent the maximum allowed speed of the user for the time interval. If the authentication module 140 determines that the current authentication request is within the time interval for the fourth threshold, then the authentication module 140 may determine or estimate that it is possible for the user to have traveled up to $L_{Base}$, plus $T_{Local}$ multiplied by the threshold speed for the second threshold, plus $T_{Region}$ multiplied by the threshold speed for the third threshold, plus the difference in the times of the authentication requests minus $T_{Local}$ minus $T_{Region}$ and multiplied by the threshold speed (e.g., the slope of the line 202) in the time interval for the fourth threshold (See equation below). This may be represented on a geographical map as a region centered around $L_{Previous}$ and greater than $L_{Region}$.

$$\text{Distance}_{Max} = L_{Base} + T_{Local} \times \text{Threshold}_2 + T_{Region} \times \text{Threshold}_3 + (\Delta\text{Time} - T_{Local} - T_{Region}) \times \text{Threshold}_4$$

Figure 3:
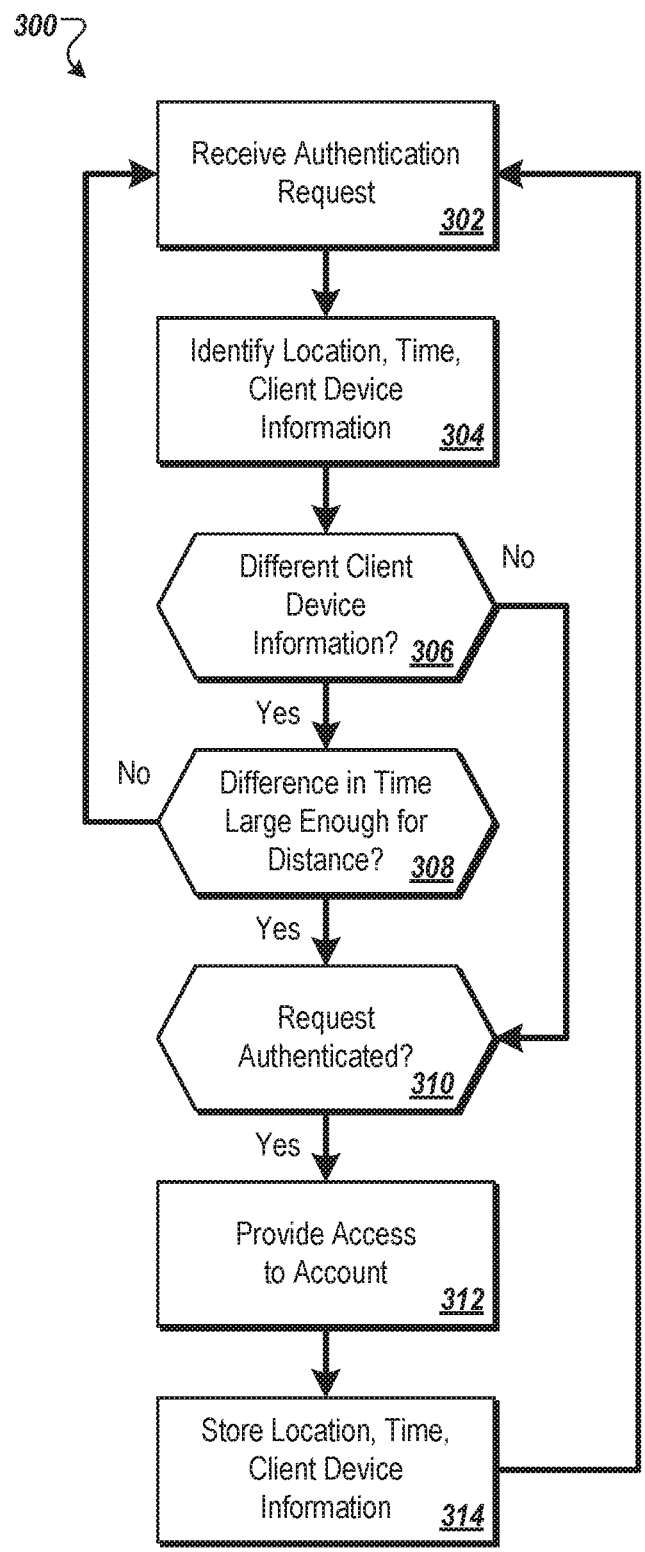
FIG. 3 is flow chart that shows an example of a process for preventing unauthorized access of an account based on a location and time of the access.

FIG. 3 is a flow chart that shows an example of a process 300 for preventing unauthorized access of an account based on a location and time of the access, in accordance with some aspects of the same disclosure. The process 300 may be performed, for example, by a system such as the systems 100 and 200. In some implementations, the process 300 may be performed by the authentication module 140 of the collaboration platform 120 or the client devices 110a-b. For clarity of presentation, the description that follows uses the systems 100 and 200 as examples for describing the process 300. However, another system, or combination of systems, may be used to perform the process 300.

At block 302, an authentication request is received by at least one processing device in a collaboration platform for an account at the collaboration platform. For example, the authentication module 140 at the collaboration platform 120 may receive an authentication request from the instance of the collaboration applications 114 at the second client device 110b. The authentication request may be a request to access services provided to the account by the collaboration platform 120. The authentication request may include authentication information, such as a user name and password for the account that are provided to the instance of the collaboration applications 114 at the second client device 110b or encrypted or hashed authentication information stored in a browser cookie.

At block 304, a geographic location and a time for the received authentication request are identified by the processing device. In some implementations, client device information for the received authentication request is identified by the processing device. For example, the authentication module 140 may identify the time of the current authentication request from the first client device 110a, the geographic location of the first client device 110a, and the client device information of the first client device 110a (e.g., the network address or the browser fingerprint).

At block 306, it may be determined whether the identified client device information is different than stored client device information for a previous successful authentication request. The identified client device information may include a network address of a client device that sent the received authentication request to the collaboration system. The stored client device information may include a stored network address of a client device that sent the previous successful authentication request to the collaboration system. The identified client device information may include a browser fingerprint of a browser at the client device that sent the received authentication request to the collaboration system. The stored client device information may include a stored browser fingerprint of a browser at the client device that sent the previous successful authentication request to the collaboration system. For example, the authentication module 140 may compare the network address of the first client device 110a to the stored network address of the second client device 110b from which the last successful authentication request was received. The authentication module 140 may compare the browser fingerprint of the first client device 110a to the stored browser fingerprint of the second client device 110b from which the last successful authentication request was received.

At block 308, it is determined whether a difference in time between the identified time and a stored time for the previous successful authentication request is large enough that a user of the account is able to travel a difference in distance between the identified geographic location and a stored geographic location for the previous successful authentication request within the difference in time. The determination of whether the difference in time is large enough may be responsive to the determination that the identified client device information is different than the stored client device information. The determination of whether the difference in time is large enough may include a comparison of the difference in time and the difference in distance to multiple thresholds that correspond to multiple ranges of time and distance. The thresholds may represent speeds of the user for the ranges of time and distance. The speeds may increase for the ranges of time and distance as the ranges of time and distance get further from the stored time and the stored geographic location. For example, the authentication module 140 may determine that the difference in time between the receipt of the current authentication request represented by the point 208 and the previous authentication request is large enough that the user of the account is able to travel the difference in distance between the geographic locations of the authentication requests.

At block 310, it is determined whether authentication information for the received authentication request is successfully authenticated by the processing device. The determination that the authentication information was successfully authenticated may be responsive to the determination that the difference in time is large enough and the determination that the identified client device information is different than the stored client device information, or responsive to the determination that the identified client device information is the same as the stored client device information. For example, the authentication module 140 may successfully authenticate the authentication information (e.g., match the user name and passwords or encrypted authentication information) for the current authentication request received from the first client device 110a.

If the client device information is the same, or the client device information is different and the difference in time is large enough, and the authentication information was successfully authenticated, then, at block 312, access is provided, by the processing device, to the client device for the account. For example, the authentication module 140 may direct the collaboration platform 120 to provide the user at the first client device 110a with access to the account at the collaboration platform 120.

If the client device information is the same, or the client device information is different and the difference in time is large enough, and the authentication information was successfully authenticated, then, at block 314, the identified geographic location, the identified time, and the identified client device information for the received authentication request are stored by the processing device. For example, the authentication module 140 may store the time, geographic location, and the client device information for the current authentication request form the first client device 110a (e.g., in the collaboration platform 120, the server 130, or the data store 106).

For simplicity of explanation, the processes of this disclosure are depicted and described as a series of acts. However, acts in accordance with this disclosure can occur in various orders and/or concurrently, and with other acts not presented and described herein. Furthermore, not all illustrated acts may be required to implement the processes in accordance with the disclosed subject matter. In addition, those skilled in the art will understand and appreciate that the processes could alternatively be represented as a series of interrelated states via a state diagram or events. Additionally, it should be appreciated that the processes disclosed in this specification are capable of being stored on an article of manufacture to facilitate transporting and transferring such processes to computing devices. The term "article of manufacture," as used herein, is intended to encompass a computer program accessible from a computer-readable device or storage media.

Figure 4:
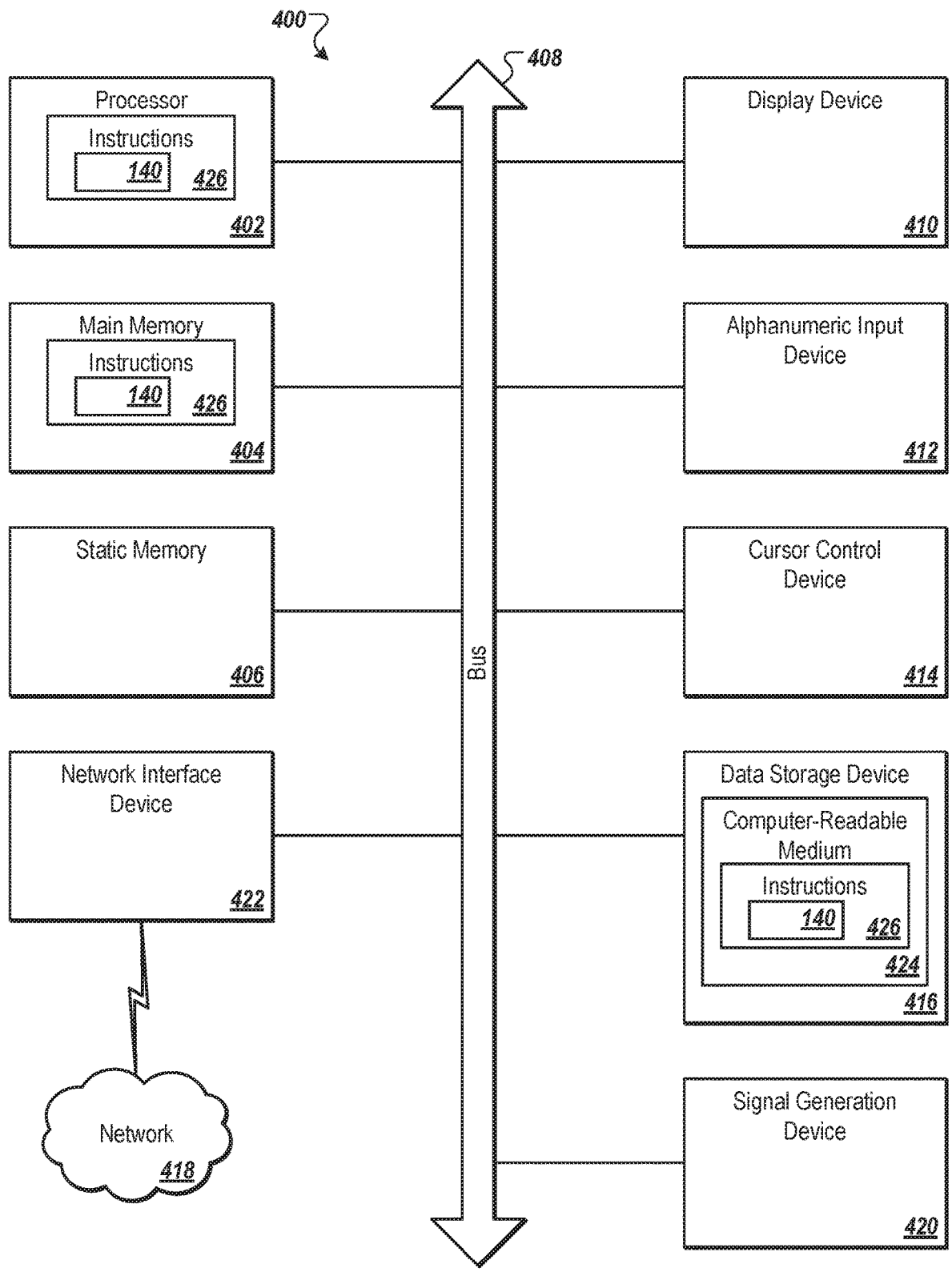
FIG. 4 is a schematic diagram that shows an example of a computing system that can be used to prevent unauthorized access of an account based on a location and time of the access.

FIG. 4 is a schematic diagram that shows an example of a machine in the form of a computer system 400 that can be used to prevent unauthorized access of an account based on a location and time of the access. The collaboration platform 120, the server 130, and the client devices 110a-b may include one or more of the computer system 400. The computer system 400 executes one or more sets of instructions 426 that cause the machine to perform any one or more of the methodologies discussed herein. The sets of instructions 426, and the like may refer to instructions that, when executed by the computer system 400, cause the computer system 400 to perform one or more operations of the authentication module 140 or one or more of the other components of the collaboration platform 120, the server 130, or the client devices 110a-b as described above. The machine may operate in the capacity of a server or a client device in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 426 to perform any one or more of the methodologies discussed herein.

The computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 416, which communicate with each other via a bus 408.

The processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions of the authentication module 140 or the one or more of the other components for performing the operations and steps discussed herein.

The computer system 400 may further include a network interface device 422 that provides communication with other machines over a network 418, such as a local area network (LAN), an intranet, an extranet, or the Internet. The computer system 400 also may include a display device 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a non-transitory computer-readable storage medium 424 (e.g., a non-transitory machine-readable storage medium) on which is stored the sets of instructions 426 of the authentication module 140 or the one or more of the other components embodying any one or more of the methodologies or functions described herein. The sets of instructions 426 of the authentication module 140 or the one or more of the other components may also reside, completely or at least partially, within the main memory 404 and/or within the processor 402 during execution thereof by the computer system 400, the main memory 404 and the processor 402 also constituting computer-readable storage media. The sets of instructions 426 may further be transmitted or received over the network 418 via the network interface device 422.

While the example of the non-transitory computer-readable storage medium 424 is shown as a single medium, the term "computer-readable storage medium" can include a single medium or multiple media (e.g., a centralized or distributed database, and/or associated caches and servers) that store the sets of instructions 426. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

However, all of these and similar terms are to be associated with the appropriate physical quantities and are merely convenient labels applied to these quantities. Unless specifically stated otherwise, it is appreciated that throughout the description, discussions utilizing terms such as "identifying", "providing", "enabling", "finding", "selecting" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

What is claimed is:

1. A method, comprising:
storing, by at least one processing device in a collaboration platform and responsive to successful authentication of a first authentication request for an account at the collaboration platform, first client device information associated with the first authentication request, a first geographic location associated with the first authentication request, and a first time of the first authentication request;
receiving, by the at least one processing device, a second authentication request for the account at the collaboration platform;
identifying, by the at least one processing device, a second geographic location associated with the second authentication request and a second time of the second authentication request;
determining, by the at least one processing device, whether client device information associated with the second authentication request is distinct from the first client device information;
in response to a determination that the client device information associated with the second authentication request is distinct from the first client device information:
determining, by the at least one processing device, whether a difference in time between the first time and the second time is sufficient to enable a user of the account to travel a difference in distance between the first geographic location and the second geographic location within the difference in time; and
providing, by the at least one processing device, access to the account responsive to a determination that the difference in time is sufficient and to successful authentication of the second authentication request, wherein the first client device information comprises a first browser fingerprint of a first browser at a first client device that sent the first authentication request to the collaboration platform, and wherein the client device information that is distinct from the first client device information comprises a second browser fingerprint of a second browser at a second client device that sent the second authentication request to the collaboration platform; and
in response to a determination that the client device information associated with the second authentication request is same as the first client device information, providing, by the at least one processing device, access to the account responsive to successful authentication of the second authentication request.

2. The method of claim 1, wherein the first client device information further comprises a first network address of the first client device that sent the first authentication request to the collaboration platform, and wherein the client device information that is distinct from the first client device information further comprises a second network address of the second client device that sent the second authentication request to the collaboration platform.

3. The method of claim 1, wherein determining whether the difference in time is sufficient to enable the user of the account to travel the difference in distance comprises comparing the difference in time and the difference in distance to a plurality of thresholds corresponding to a plurality of ranges of time and distance.

4. The method of claim 3, wherein the thresholds are associated with corresponding speeds of the user for the ranges of time and distance.

5. The method of claim 4, wherein the speeds increase for the ranges of time and distance as the ranges of time and distance get further from the first time and the first geographic location.

6. The method of claim 3, wherein the plurality of thresholds are adjustable based on an error amount due to a type of positioning system used to determine the first geographic location or the second geographic location.

7. A non-transitory computer-readable medium having instructions stored therein that, in response to execution by at least one processing device, cause the processing device to perform or control performance of operations that comprise:
store, in a collaboration platform and responsive to successful authentication of a first authentication request for an account at the collaboration platform, first client device information associated with the first authentication request, a first geographic location associated with the first authentication request, and a first time of the first authentication request;
receive a second authentication request for the account at the collaboration platform;
identify a second geographic location associated with the second authentication request and a second time of the second authentication request;
determine whether client device information associated with the second authentication request is distinct from the first client device information;
in response to a determination that the client device information associated with the second authentication request is distinct from the first client device information:
determine whether a difference in time between the first time and the second time is sufficient to enable a user of the account to travel a difference in distance between the first geographic location and the second geographic location within the difference in time; and
provide access to the account responsive to a determination that the difference in time is sufficient and to successful authentication of the second authentication request, wherein the first client device information comprises a first browser fingerprint of a first browser at a first client device that sent the first authentication request to the collaboration platform, and wherein the client device information that is distinct from the first client device information comprises a second browser fingerprint of a second browser at a second client device that sent the second authentication request to the collaboration platform; and in response to a determination that the client device information associated with the second authentication request is same as the first client device information, provide access to the account responsive to successful authentication of the second authentication request.

8. The non-transitory computer-readable medium of claim 7, wherein the first client device information further comprises a first network address of the first client device that sent the first authentication request to the collaboration platform, and wherein the client device information that is distinct from the first client device information further comprises a second network address of the second client device that sent the second authentication request to the collaboration platform.

9. The non-transitory computer-readable medium of claim 7, wherein to determine whether the difference in time is sufficient to enable the user of the account to travel the difference in distance, the instructions are executable by the at least one processing device to cause the at least one processing device to perform or control performance of operations that include:

compare the difference in time and the difference in distance to a plurality of thresholds corresponding to a plurality of ranges of time and distance.

10. The non-transitory computer-readable medium of claim 9, wherein the thresholds are associated with corresponding speeds of the user for the ranges of time and distance.

11. The non-transitory computer-readable medium of claim 10, wherein the speeds increase for the ranges of time and distance as the ranges of time and distance get further from the first time and the first geographic location.

12. The non-transitory computer-readable medium of claim 9, wherein the plurality of thresholds are adjustable based on an error amount due to a type of positioning system used to determine the first geographic location or the second geographic location.

13. A system, comprising:
at least one memory that stores instructions; and
at least one processing device coupled to the at least one memory and configured to execute the instructions to perform or control performance of operations that include:
store, in a collaboration platform and responsive to successful authentication of a first authentication request for an account at the collaboration platform, first client device information associated with the first authentication request, a first geographic location associated with the first authentication request, and a first time of the first authentication request;
receive a second authentication request for the account at the collaboration platform;
identify a second geographic location associated with the second authentication request and a second time of the second authentication request;

determine whether client device information associated with the second authentication request is distinct from the first client device information;

in response to a determination that the client device information associated with the second authentication request is distinct from the first client device information:

determine whether a difference in time between the first time and the second time is sufficient to enable a user of the account to travel a difference in distance between the first geographic location and the second geographic location within the difference in time; and provide access to the account responsive to a determination that the difference in time is sufficient and to successful authentication of the second authentication request, wherein the first client device information comprises a first browser fingerprint of a first browser at a first client device that sent the first authentication request to the collaboration platform, and wherein the client device information that is distinct from the first client device information comprises a second browser fingerprint of a second browser at a second client device that sent the second authentication request to the collaboration platform; and in response to a determination that the client device information associated with the second authentication request is same as the first client device information, provide access to the account responsive to successful authentication of the second authentication request.

14. The system of claim 13, wherein the first client device information further comprises a first network address of the first client device that sent the first authentication request to the collaboration platform, and wherein the client device information that is distinct from the first client device information further comprises a second network address of the second client device that sent the second authentication request to the collaboration platform.

15. The system of claim 13, wherein to determine whether the difference in time is sufficient to enable the user of the account to travel the difference in distance, the at least one processing device is configured to execute the instructions to perform or control performance of operations that include:

compare the difference in time and the difference in distance to a plurality of thresholds corresponding to a plurality of ranges of time and distance.

16. The system of claim 15, wherein the thresholds are associated with corresponding speeds of the user for the ranges of time and distance, and wherein the speeds increase for the ranges of time and distance as the ranges of time and distance get further from the first time and the first geographic location.

17. The system of claim 15, wherein the plurality of thresholds are adjustable based on an error amount due to a type of positioning system used to determine the first geographic location or the second geographic location.

\* \* \* \* \*